United States Patent [19]

Yoshimura et al.

[11] Patent Number: 5,021,956

[45] Date of Patent: Jun. 4, 1991

[54] CONTROL SYSTEMS FOR VEHICLE ENGINES COUPLED WITH AUTOMATIC TRANSMISSIONS

[75] Inventors: Hiroshi Yoshimura; Kazuo Takemoto; Toshihiro Yamada, all of Hiroshima, Japan

[73] Assignee: Mazda Motor Corporation, Hiroshima, Japan

[21] Appl. No.: 340,134

[22] Filed: Apr. 18, 1989

[30] Foreign Application Priority Data

Apr. 25, 1988 [JP] Japan .................. 63-100092
Apr. 25, 1988 [JP] Japan .................. 63-100094
May 18, 1988 [JP] Japan .................. 63-121200

[51] Int. Cl.⁵ .......................................... B60K 31/04
[52] U.S. Cl. ................................. 364/424.1; 74/866; 123/418; 123/489
[58] Field of Search ............... 364/424.1, 431.07; 74/866; 123/418, 489

[56] References Cited

U.S. PATENT DOCUMENTS

| | | | |
|---|---|---|---|
| 4,771,752 | 9/1988 | Nishimura et al. | 123/489 |
| 4,799,469 | 1/1989 | Nagano et al. | 123/418 |
| 4,811,223 | 3/1989 | Iwatsuki et al. | 364/424.1 |
| 4,811,224 | 3/1989 | Kuerschner et al. | 364/424.1 |

FOREIGN PATENT DOCUMENTS 0228899 7/1987 European Pat. Off. .
61-104128 5/1986 Japan .

*Primary Examiner*—Parshotam S. Lall
*Assistant Examiner*—Tyrone Queen
*Attorney, Agent, or Firm*—Sixbey, Friedman, Leedom & Ferguson

[57] ABSTRACT

A control system for a vehicle engine coupled with an automatic transmission, which comprises a controller operative to control a controllable subject, such as ignition timing, in the vehicle engine, in accordance with a controlled variable determined for the controllable subject, for varying an engine output of the vehicle engine in response to an operating condition of the vehicle engine and further for reducing the engine output so as to suppress torque shock resulting from a speed change operation carried out in the automatic transmission, a controlled variable setting device for determining the controlled variable in accordance with the operating condition of the vehicle engine and an operating condition of the automatic transmission, and a controlled variable revising device for varying the controlled variable so as to restrict variation in the controllable subject when the speed change operation is carried out in the automatic transmission under a condition in which the controllable subject is controlled to reduce the engine output in response to the operating condition of the vehicle engine.

14 Claims, 15 Drawing Sheets

FIG. 1
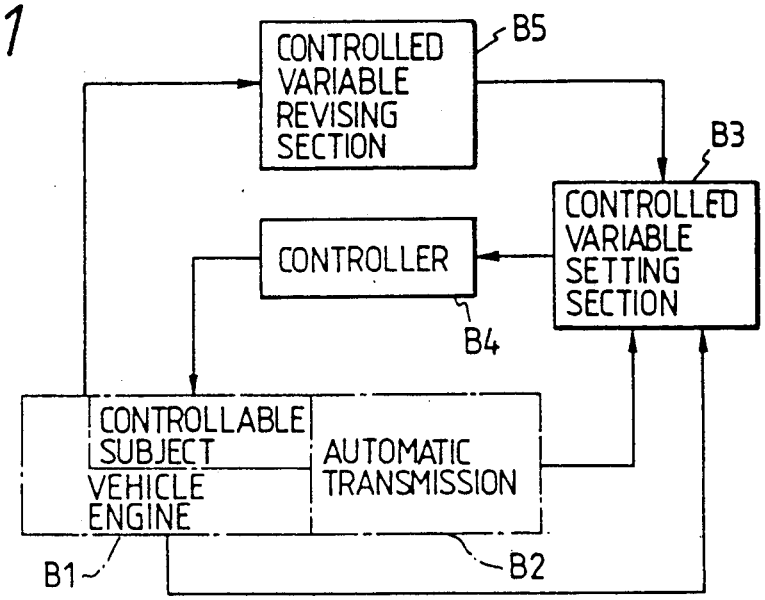
FIG. 12A  $T_h$
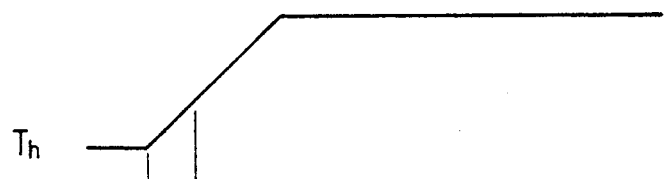
FIG. 12B  $P_j$
FIG. 12C  $\theta A$
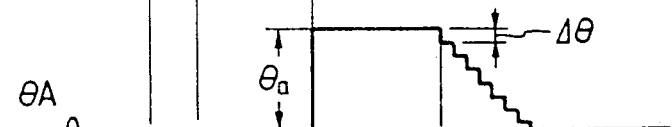
FIG. 12D  $T_R$
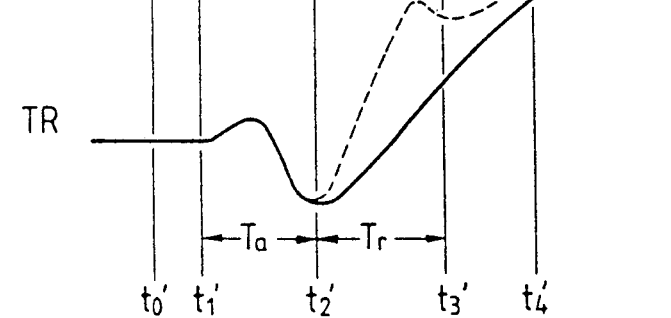

FIG. 13A $P_j$
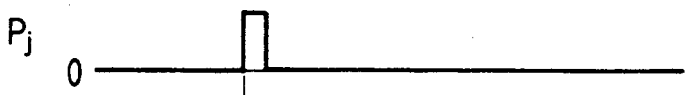
FIG. 13B $\theta A$ $\theta_a$
FIG. 13C $\theta K$
FIG. 13D $\theta R$
$t_1''$ $t_2''$

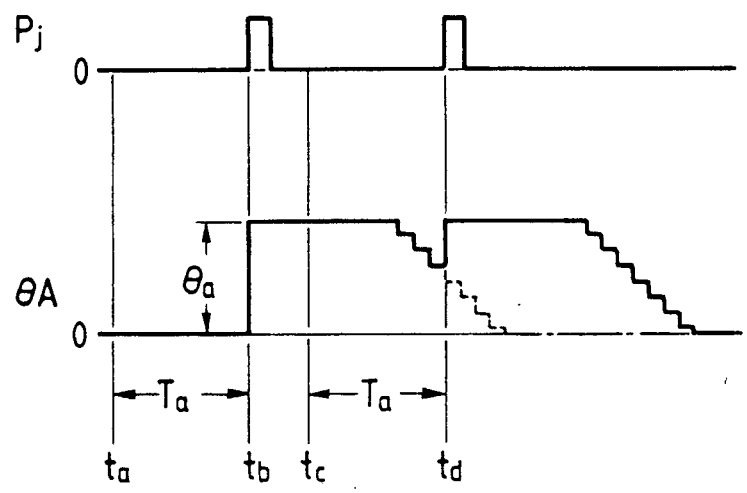
FIG. 14A
FIG. 14B
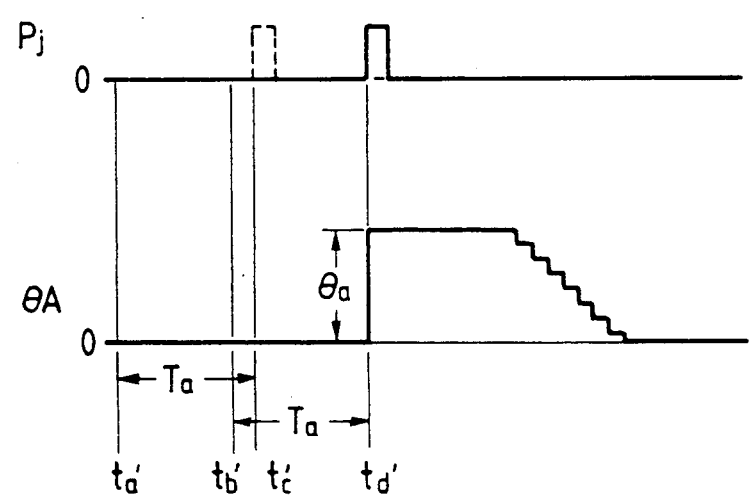
FIG. 15A
FIG. 15B

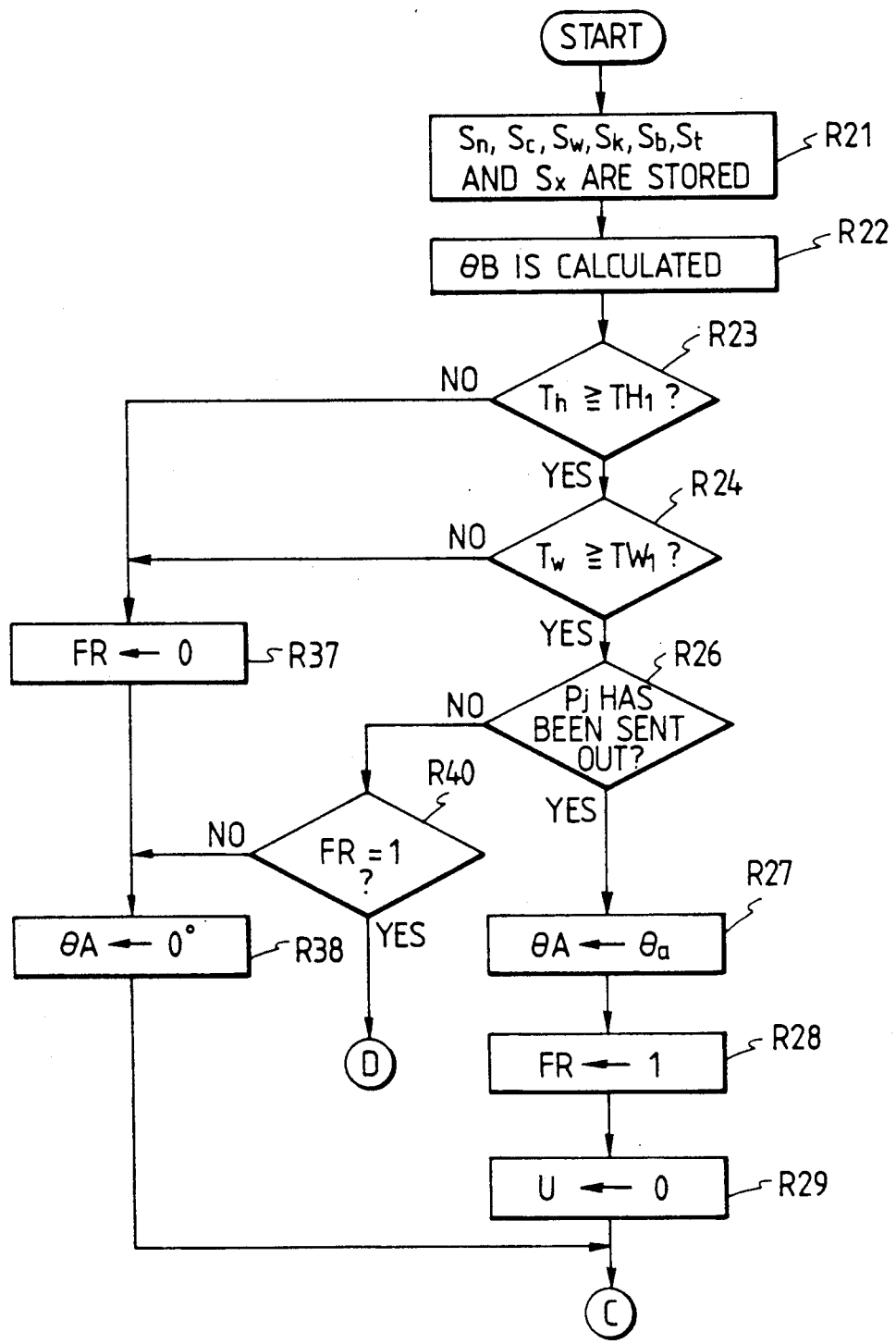

FIG. 17-b
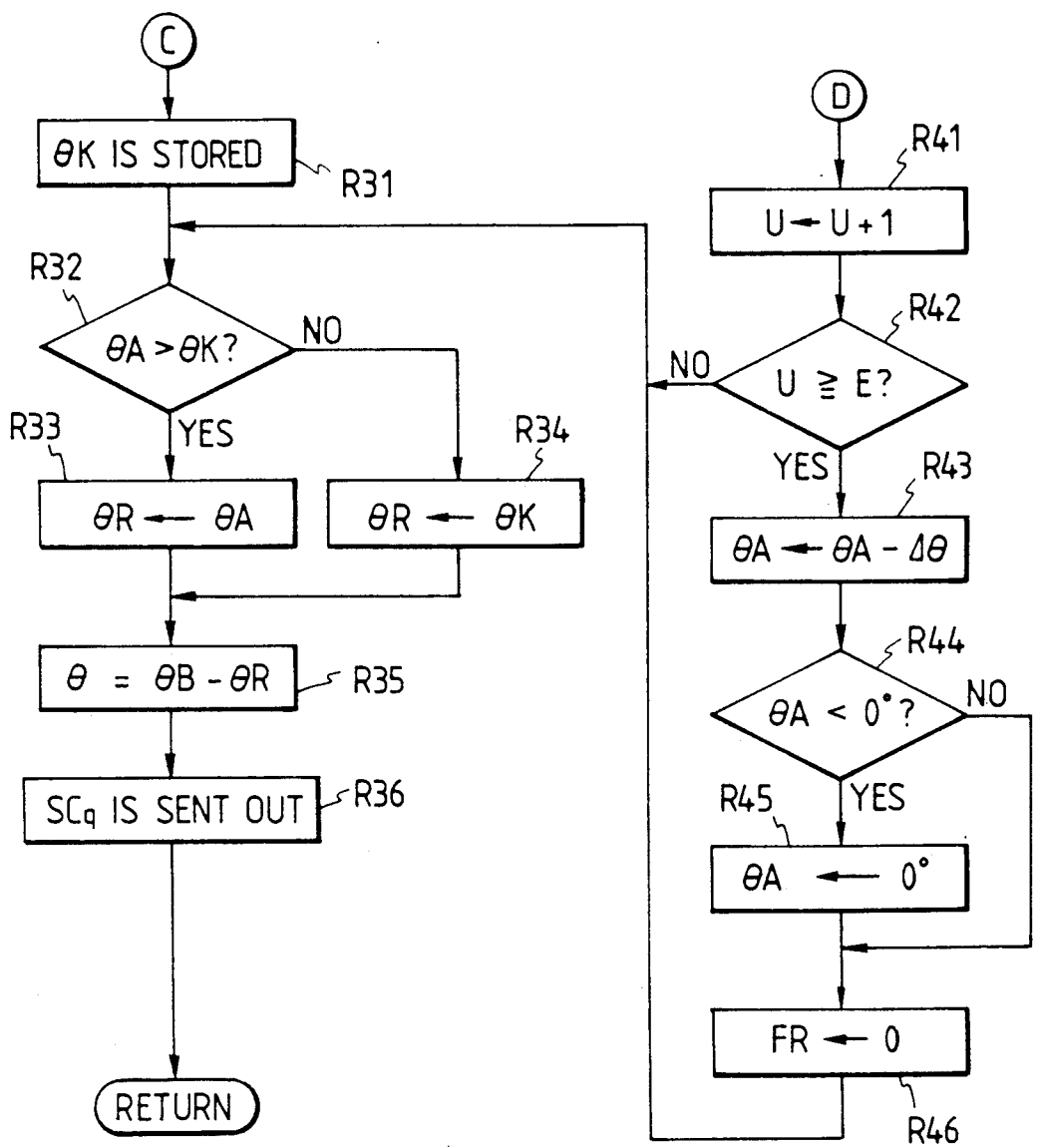

CONTROL SYSTEMS FOR VEHICLE ENGINES COUPLED WITH AUTOMATIC TRANSMISSIONS

BACKGROUND OF THE INVENTION

1. Field of the Invention

The present invention relates generally to control systems for vehicle engines coupled with automatic transmissions, and more particularly, to a system for controlling an output of a vehicle engine which is coupled with an automatic transmission employed in a vehicle so as to restrain torque shocks brought about by speed change operations performed in the automatic transmission.

2. Description of the Prior Art

There has been commonly used in vehicles an automatic transmission which is coupled with an engine provided in the vehicle and includes a torque converter comprising a pump impeller, a turbine runner and a stator, and a power transmitting gear arrangement including a speed change mechanism connected to the turbine runner in the torque converter. Such an automatic transmission employed to be coupled with the engine in the vehicle is usually accompanied with a hydraulic pressure control device including an oil hydraulic control circuit, by which engaging friction elements, such as clutch and brake elements, operating with oil pressure in the speed change mechanism are caused to work for a speed change operation.

When the speed change operation is carried out in the automatic transmission accompanied with the hydraulic pressure control device, sudden rise or fall in speed of the engine is caused in response to variations in a gear ratio in the speed change mechanism and thereby sudden variations in torque are caused on an output shaft of the automatic transmission. This results in that torque shock on the vehicle is brought about by each speed change operation performed in the automatic transmission.

With the intention of suppressing the torque shock resulting from the speed change operation, it is considered to adjust oil pressure applied to the engaging friction elements so that each engaging friction element comes into engagement or disengagement gradually and smoothly. In such a case, however, a period of time in which the engaging friction element is kept in a slipping condition in process of the speed change operation is protracted and therefore it is feared that the engaging friction element is subjected to seizing and abrasion of great degree.

In view of this, there has been proposed to reduce an engine output obtained from the engine for a predetermined duration on the occasion of the speed change operation so as to suppress the torque shock resulting from the speed change operation, as disclosed in, for example, the Japanese patent application published before examination under publication number 61-104128. In the case where the engine output is thus reduced for suppressing the torque shocks, for example, ignition timing is selected as a controlled subject for varying the engine output and controlled to be retarded, compared with a normal ignition timing, so as to reduce the engine output during the speed change operation.

Usually, the ignition timing of the engine is subjected to a control for keeping the operation of the engine in a desirous condition, such as a control for suppressing knocking in which the ignition timing is so retarded that the knocking is prevented from arising when the knocking is caused. Therefore, in the case of the engine which is coupled with the automatic transmission and in which the ignition timing is subjected to the control for suppressing the torque shock in which the ignition timing is retarded to reduce the engine output on the occasion of the speed change operation in addition to the control for suppressing the knocking, it is feared that the ignition timing is retarded excessively so that the engine output is undesirably reduced in excess of necessity.

Such a disadvantage caused by that the control for suppressing the knocking and the control for suppressing the torque shock resulting from the speed change are carried out with a common controlled subject is to be also caused when intake air mass flow, fuel quantity supplied to the engine or other controllable variable is selected as the common controlled subject for varying the engine output.

Further, in an engine coupled with an automatic transmission which can operate with either of regular gasoline and high-octane gasoline, an engine output obtained with the high-octane gasoline is larger then that obtained with the regular gasoline and therefore the engine output is reduced in a relatively large degree during the speed change operation carried out in the automatic transmission when the high-octane gasoline is used as fuel in the engine. Accordingly, under a condition in which the reduction in engine output is set for the high-octane gasoline, the engine output is reduced excessively during the speed change operation when the regular gasoline is used as fuel in the engine, and to the contrary, under a condition in which the reduction in engine output is set for the regular gasoline, the engine output is not reduced sufficiently for suppressing torque shock during the speed change operation when the high-octane gasoline is used as fuel in the engine.

OBJECTS AND SUMMARY OF THE INVENTION

Accordingly, it is an object of the present invention to provide a control system for a vehicle engine coupled with an automatic transmission, in which a control for adjusting a controllable subject for varying an engine output in accordance with the operating condition of the vehicle engine and a control for reducing the engine output so as to suppress torque shock resulting from a speed change operation carried out in the automatic transmission are performed, and which avoids the aforementioned disadvantages and problems encountered with the prior art.

Another object of the present invention to provide a control system for a vehicle engine coupled with an automatic transmission, in which a first control for adjusting a controllable subject for varying an engine output in accordance with the operating condition of the vehicle engine and a second control for reducing the engine output so as to suppress torque shock resulting from a speed change operation carried out in the automatic transmission are performed and the torque shock is suppressed sufficiently without inducing an excessive reduction of the engine output on the occasion of the speed change operation.

In accordance with the present invention, there is provided a control system for a vehicle engine coupled with an automatic transmission comprising a controller operative to control a controllable subject in the vehicle engine, in accordance with a controlled variable determined for the controllable subject, for varying an engine output of the vehicle engine in response to an operating condition of the vehicle engine and further for reducing the engine output so as to suppress torque shock resulting from a speed change operation carried out in the automatic transmission, a controlled variable setting device for determining the controlled variable based on the operating condition of the vehicle engine and an operating condition of the automatic transmission, and a controlled variable revising device for varying the controlled variable so as to restrict variation in the controllable subject when the speed change operation is carried out in the automatic transmission under a condition in which the controllable subject is controlled to reduce the engine output in accordance with the operating condition of the vehicle engine.

In the control system thus constituted in accordance the present invention, a first control for adjusting the controllable subject to vary the engine output in accordance with the operating condition of the vehicle engine and a second control for adjusting the controllable subject to reduce the engine output for suppressing torque shock resulting from the speed change operation are performed by the controller in response to the controlled variable determined by the controlled variable setting device. Then, on the occasion of the speed change operation carried out in the automatic transmission under the condition in which the engine output is reduced through the first control, the controlled variable is varied by the controlled variable revising device so that the reduction of the engine output caused by the second control is restricted. Accordingly, the torque shock resulting from the speed change operation carried out in the automatic transmission is suppressed sufficiently and the engine output is prevented from being undesirably reduced in excess of necessitate even during the speed change operation carried out under the condition in which the engine output is reduced through the first control.

In an embodiment of control system for a vehicle engine coupled with an automatic transmission according to the present invention, the controlled variable contains a fundamental variable, a first supplemental variable obtained based on the operating condition of the vehicle engine and a second supplemental variable obtained based of the speed change operation in the automatic transmission, and the second supplemental variable is reduced or vanished when the speed change operation is carried out in the automatic transmission under the condition in which the engine output is reduced through the first control.

In another embodiment of control system for a vehicle engine coupled with an automatic transmission according to the present invention, the controlled variable contains a fundamental variable, a first supplemental variable obtained based on the operating condition of the vehicle engine and a second supplemental variable obtained based of the speed change operation in the automatic transmission, and one of the first and second supplemental variables which is smaller that the other is not used for adjusting the controllable subject when the speed change operation is carried out in the automatic transmission under the condition in which the engine output is reduced through the first control.

In a further embodiment of control system for a vehicle engine coupled with an automatic transmission according to the present invention, the controlled variable contains a fundamental variable, a first supplemental variable obtained based on the operating condition of the vehicle engine and a second supplemental variable obtained based of the speed change operation in the automatic transmission, and the second supplemental variable obtained under a condition in which regular gasoline is used as fuel in the vehicle engine is determined to be smaller than the second supplemental variable obtained under a condition in which high-octane gasoline is used as fuel in the vehicle engine.

The above, and other objects, features and advantages of the present invention will become apparent from the following detailed description which is to be read in conjunction with the accompanying drawings.

BRIEF DESCRIPTION OF THE DRAWINGS

FIG. 1 is a block diagram illustrating the basic arrangement of a control system for a vehicle engine coupled with an automatic transmission according to the present invention;

FIGS. 12A to 12D, 13A to 13D, 14A, 14B, 15A and 15B are time charts used for explaining the operation of the embodiment shown in FIG. 9; and FIGS. 16, 17a, 17b and 18 are flow charts showing examples of operational programs for a microcomputer used in a control unit employed in the embodiment shown in FIG. 9.

DESCRIPTION OF THE PREFERRED EMBODIMENTS

FIG. 1 illustrates a functional block diagram of a system incorporating the present invention. In the functional block diagram of FIG. 1, the system comprises a vehicle engine B1 coupled with an automatic transmission B2, a controlled variable setting section B3, a controller B4, and a controlled variable revising section B5.

The controlled variable setting section B3 is operative to determine a controlled variable for a controllable subject in the vehicle engine B1 based on an operating condition of the vehicle engine B1 and an operating condition of the automatic transmission B2. The controller B4 is operative to adjust the controllable subject in the vehicle engine B1, in response to the controlled variable which is determined by the controlled variable setting section B3, for varying an engine output of the vehicle engine B1 in accordance with the operating condition of the vehicle engine B1 and further for reducing the engine output so as to suppress torque shock resulting from a speed change operation carried out in the automatic transmission B2. Then, the controlled variable revising section B5 is operative to reduce the controlled variable which is determined by the controlled variable setting section B3 when the speed change operation is carried out in the automatic transmission B2 under a condition in which the controllable subject in the vehicle engine B1 is controlled to reduce the engine output in accordance with the operating condition of the vehicle engine B1.

Figure 2:
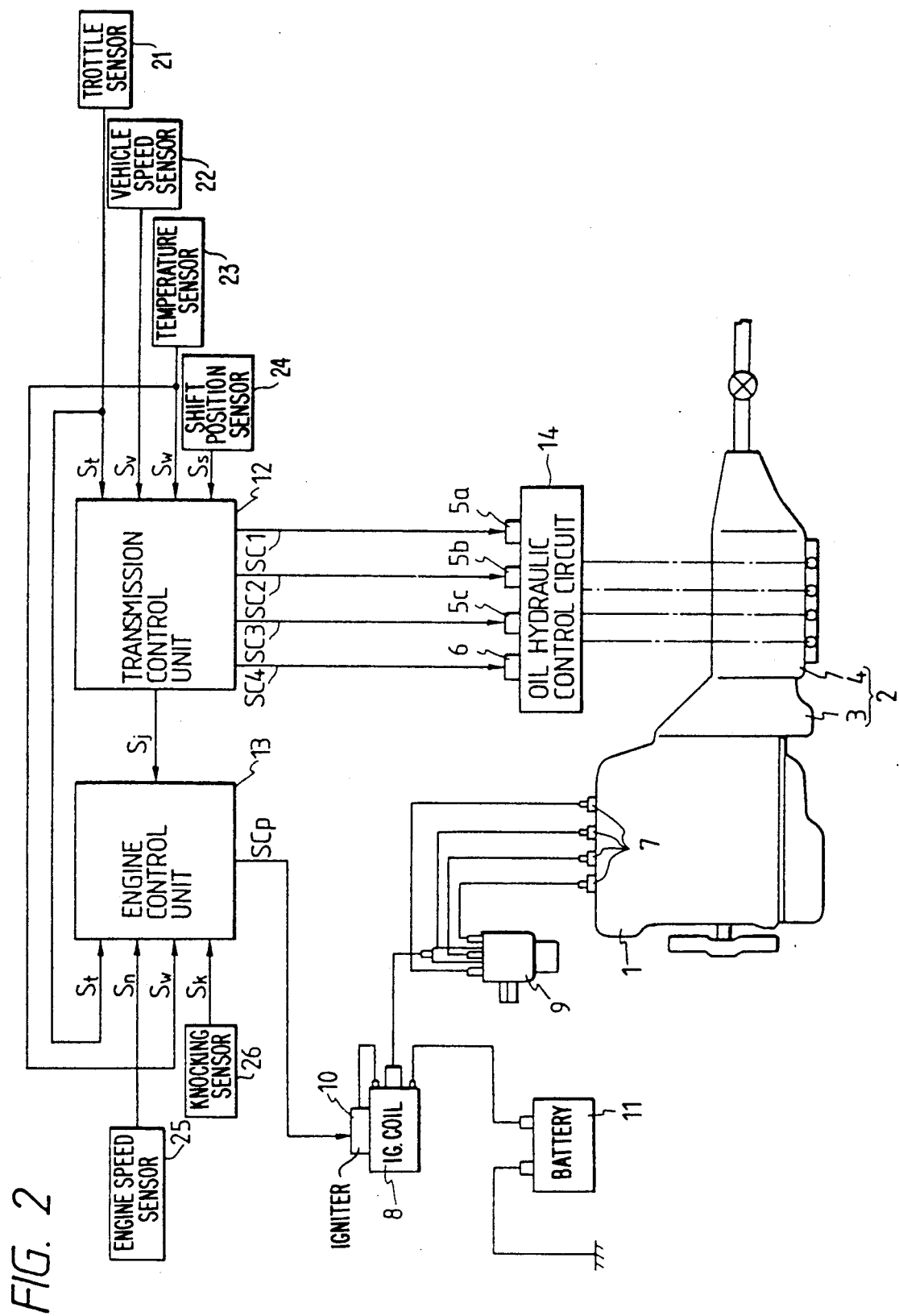
FIG. 2 is a schematic illustration showing an embodiment of control system for a vehicle engine coupled with an automatic transmission according to the present invention, together with essential portions of an engine to which the embodiment is applied.

FIG. 2 illustrates a first embodiment of control system for a vehicle engine coupled with an automatic transmission according to the present invention, together with portions of a vehicle engine to which the first embodiment is applied.

Referring to FIG. 2, a vehicle engine 1, which is a reciprocating engine having four cylinders and able to operate with either of regular gasoline and high-octane gasoline, is coupled with an automatic transmission 2. The automatic transmission 2 comprises a torque converter 3 having a lock-up clutch device and a power transmitting gear arrangement 4 provided with a planetary gear unit and a plurality of engaging friction devices, such as clutches and brakes, for obtaining four forward speeds and one reverse speed. The power transmitting gear arrangement 4 is accompanied with an oil hydraulic control circuit 14 provided with solenoid valves 5a, 5b, 5c and 6 for supplying the engaging friction devices and the lock-up clutch device with operating oil pressure. Each of the engaging friction devices and the lock-up clutch is put into engagement and disengagement selectively in accordance with the operating oil pressure applied thereto.

An ignition system for the vehicle engine 1 comprises ignition plugs 7 provided to four cylinders, respectively, an ignition coil 8 connected to a battery 11, a distributor 9 and an igniter 10 attached to the ignition coil 8. The igniter 10 is operative to switch off a current flowing through a primary winding of the ignition coil 8 to produce a high-voltage pulse at a secondary winding of the ignition coil 8 at every ignition timing, and the high-voltage pulse obtained at the secondary winding of the ignition coil 8 is applied through the distributor 9 to a selected one of the ignition plugs 7 to cause the same to fire.

The solenoid valves 5a, 5b, 5c and 6 in the oil hydraulic control circuit 14 is controlled by a transmission control unit 12 which contains a microcomputer and the igniter 10 is controlled by an engine control unit 13 which contains also a microcomputer.

The transmission control unit 12 is supplied with a detection output signal St obtained from a throttle sensor 21 for detecting opening degree of a throttle valve (throttle opening degree), a detection output signal Sv obtained from a speed sensor 22 for detecting traveling speed of a vehicle, a detection output signal Sw obtained from a temperature sensor 23 for detecting temperature of a cooling water (cooling water temperature), a detection output signal Ss obtained from a shift position sensor 24 for detecting a position of a shift lever provided in the vehicle and other necessary detection output signals. Further, the engine control unit 13 is supplied with the detection output signal St obtained from the throttle sensor 21, a detection output signal Sn obtained from an engine speed sensor 25 for detecting speed of the vehicle engine 1, the detection output signal Sw obtained from the temperature sensor 23, and a detection output signal Sk obtained from a knocking sensor 26 for detecting knocking in the vehicle engine 1.

Figure 3:
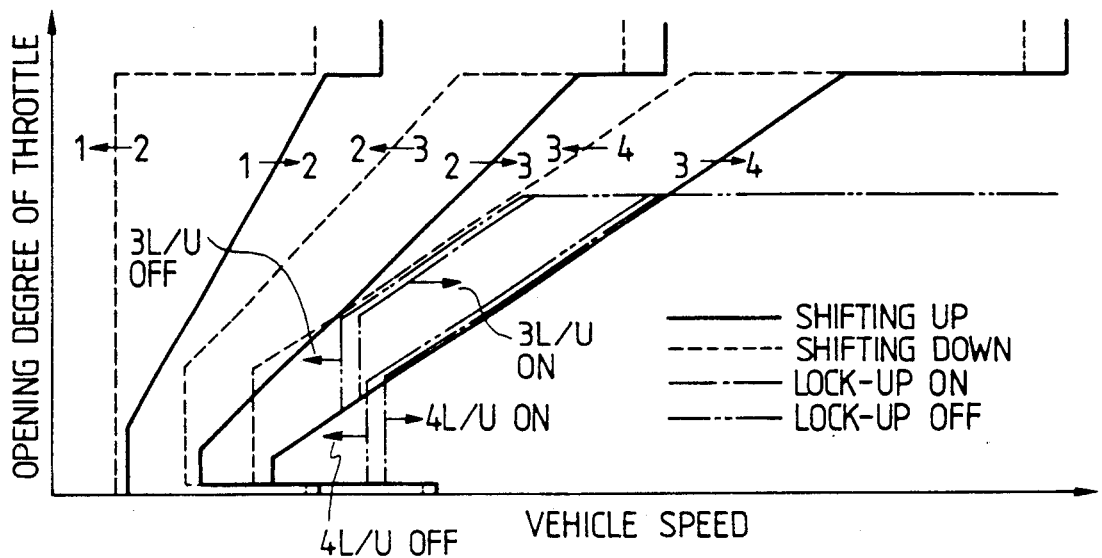
FIG. 3 shows a speed change characteristic map used for explaining the operation of the embodiment shown in FIG. 2.

The transmission control unit 12 is operative to supply selectively the solenoid valves 5a, 5b, 5c and 6 in the oil hydraulic control circuit 14 respectively with driving pulse signals SC1, SC2, SC3 and SC4 so as to cause the automatic transmission 2 to perform a speed change operation and a locking-up operation in accordance with, for example, a speed change characteristic shown in FIG. 3, and further to supply, for a predetermined period of time, the engine control unit 13 with a command signal Sj which is produced based on the detection output signals St, Sv, Sw and Ss for requiring the engine control unit 13 to reduce an engine output of the vehicle engine 1 on the occasion of the speed change operation carried out in the automatic transmission 2 under a predetermined condition. In the case where the speed change operation is carried out under a condition wherein the cooling water temperature in the vehicle engine 1, which is represented by the detection output signal Sw, is lower than 72° C., for example, or the throttle opening degree represented by the detection output signal St is smaller than 50%, for example, the transmission control unit 12 does not send out the command signal Sj. In addition, when the speed change operation is carried out for shifting down, the transmission control unit 12 does not send out the command signal Sj.

The engine control unit 13 is operative to generate an ignition control signal SCp based on the detection output signals St, Sn, Sw and Sk and the command signal Sj from the transmission control unit 12 and to supply the igniter 10 with the ignition control signal SCp so as to perform an ignition timing control.

The ignition timing control by the engine control unit 13 is carried out in such a manner as described below.

First, a fundamental advanced angle of crank rotation corresponding to a fundamental ignition timing is determined based on the engine speed represented by the detection output signal Sn and the throttle opening degree represented by the detection output signal St. In such a case, the fundamental advanced angle of crank rotation is set to be appropriate for the operation of the vehicle engine 1 in which the high-octane gasoline is used as fuel.

In the case where knocking arises in the vehicle engine 1, a first retarding angle of crank rotation is provided for retarding an actual ignition timing compared with the fundamental ignition timing so as to suppress the knocking, and when the regular gasoline is used as fuel in the vehicle engine 1, a second retarding angle of crank rotation, which is set to be 10° by way of example, is provided for retarding the actual ignition timing compared with the fundamental ignition timing. The operating condition of the vehicle engine 1 in which the regular gasoline is used as fuel is detected by means of that the second retarding angle of crank rotation provided for suppressing the knocking becomes more then a predetermined value, for example, 7°.

Figure 4:
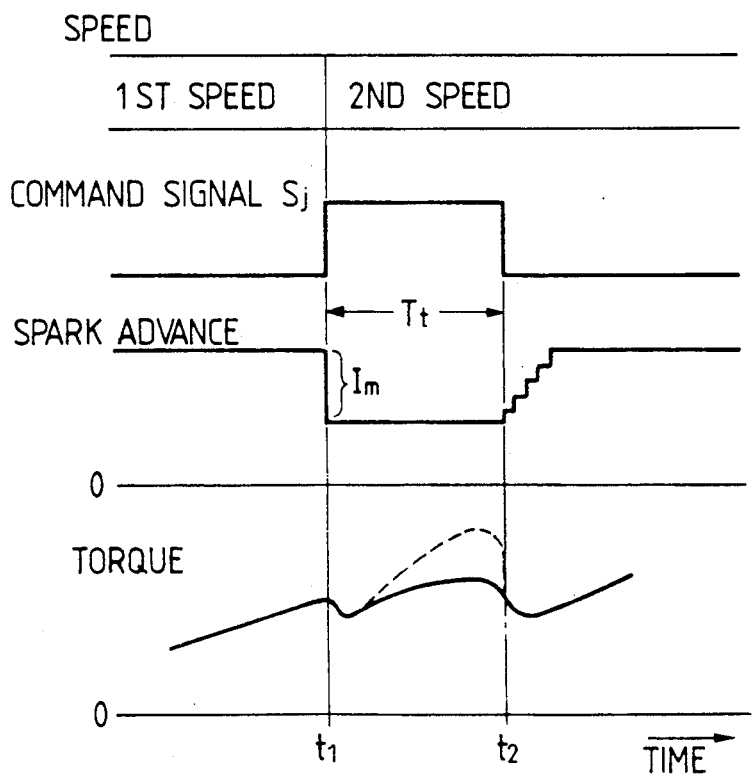
FIG. 4 is time charts used for explaining the operation of the embodiment shown in FIG. 2.

Further, when the command signal Sj is supplied to the engine control unit 13 from the transmission control unit 12, a third retarding angle of crank rotation is provided for retarding the actual ignition timing compared with the fundamental ignition timing so as to reduce the engine output of the vehicle engine 1. For example, as shown in FIG. 4, in the case where the speed change operation for shifting up by which the first speed is shifted to the second speed is commenced at a time point $t_1$ in the automatic transmission 2, the command signal Sj having a high level is supplied to the engine control unit 13 from the transmission control unit 12 for a period Tt between the time period $t_1$ and a time point $t_2$. In response to the command signal Sj thus supplied, the engine control unit 13 operates to provide the third retarding angle of crank rotation for retarding the actual ignition timing compared with the fundamental ignition timing for the duration of the period Tt, so that a spark advance is reduced by Im corresponding to the third retarding angle and thereby the engine output represented by a torque of the vehicle engine 1 is reduced as shown by a solid line for the duration of the period Tt, compared with a torque obtained without the reduction in spark advance as shown in a broken line in FIG. 4.

The above mentioned ignition timing control with the third retarding angle of crank rotation is carried out with the exception of the following case 1 to case 4.

Case 1: When the cooling water temperature in the vehicle engine 1 is lower than 72° C., the third retarding angle of crank rotation is not provided regardless of the command signal Sj supplied to the engine control unit 13 from the transmission control unit 12.

The reason for this is that the vehicle engine 1 which is operating with the cooling water temperature lower than 72° C. is easily deteriorated in operation by retarding the ignition timing. With such a exceptional case 1, the vehicle engine 1 is prevented surely from being deteriorated in operation even if the command signal Sj is supplied wrongly to the engine control unit 13 from the transmission control unit 12 under the condition wherein the cooling water temperature in the vehicle engine 1 is lower than 72° C.

Case 2: After a predetermined period of time, for example, 1 second has passed since the command signal Sj is commenced to be supplied to the engine control unit 13 from the transmission control unit 12, the third retarding angle of crank rotation is not provided regardless of the command signal Sj supplied to the engine control unit 13 from the transmission control unit 12.

The predetermined period of time may be set to correspond substantially to a duration of the speed change operation in the automatic transmission 2.

Case 3: When the first retarding angle of crank rotation provided suppressing the knocking in the vehicle engine 1 is larger than a predetermined value, for example, 4°, the third retarding angle of crank rotation is not provided regardless of the command signal Sj supplied to the engine control unit 13 from the transmission control unit 12.

The reason for this is that the vehicle engine 1 which is operating with the ignition timing retarded in a relatively large degree by the first retarding angle of crank rotation and therefore reduced in its engine output considerably is easily deteriorated in operation by retarding further the ignition timing.

Case 4: When the regular gasoline is used as fuel, the third retarding angle of crank rotation is not provided regardless of the command signal Sj supplied to the engine control unit 13 from the transmission control unit 12.

The reason for this is that the vehicle engine 1 which is operating with the regular gasoline and therefore with the ignition timing retarded by the second retarding angle of crank rotation to be reduced in its engine output is easily deteriorated in operation by retarding further the ignition timing.

The above described command signal supplying operation by the transmission control unit 12 is effected mainly by the microcomputer contained in the transmission control unit 12 and the ignition timing control by the engine control unit 13 is effected mainly by the microcomputer contained in the engine control unit 13.

Figure 5:
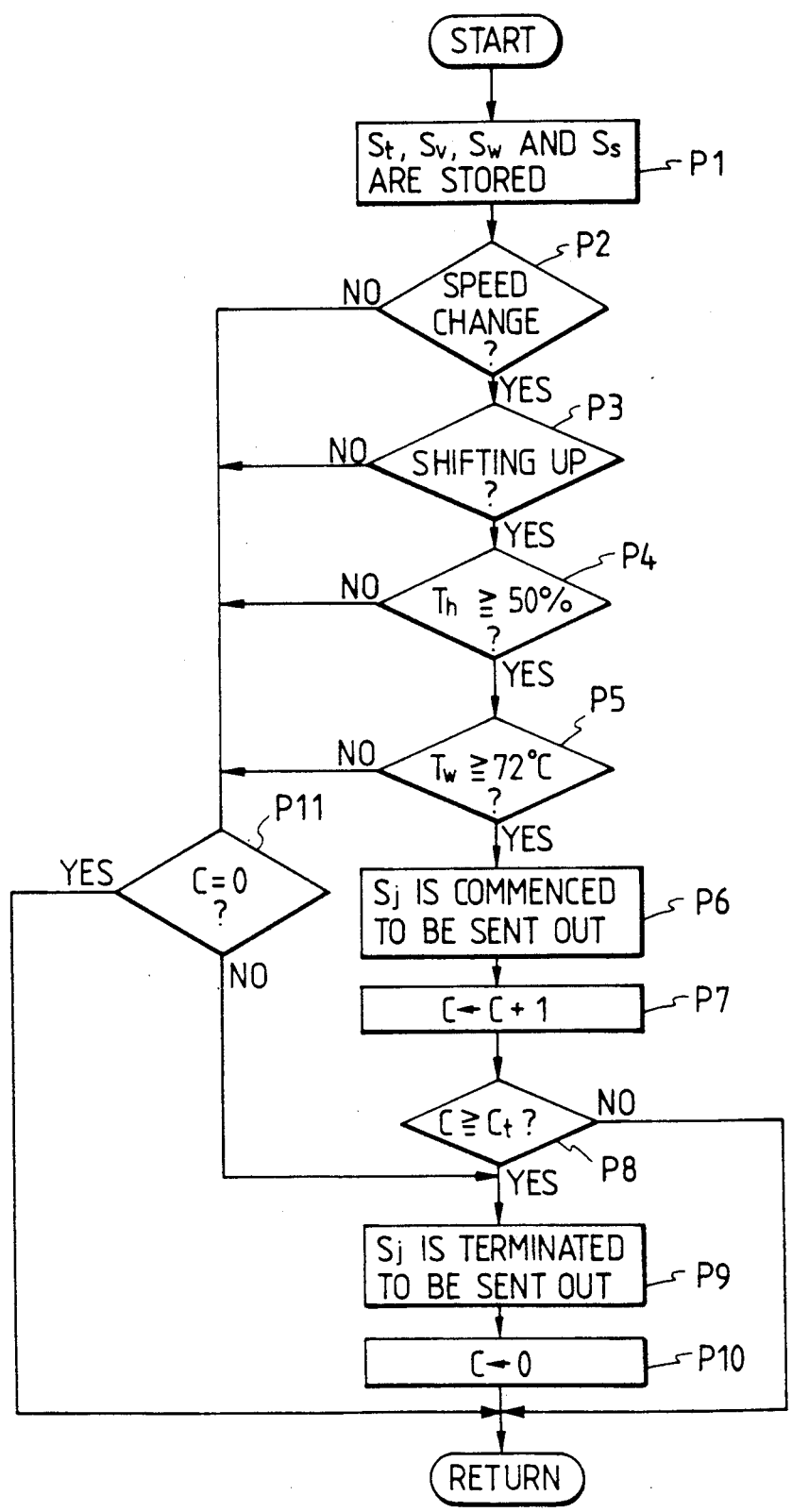
FIGS. 5 to 8 are flow charts showing examples of operational programs for a microcomputer used in a control unit employed in the embodiment shown in FIG. 2.

One example of an operation program for the command signal supplying operation is carried out in the microcomputer contained in the transmission control unit 12 in accordance with a flow chart shown in FIG. 5.

According to the flow chart in FIG. 5, first, in step P1, the detection output signals St, Sv, Sw and Ss are stored, and then, in step P2, it is checked whether a speed change operation has been commenced or not. If the speed change operation has been commenced, it is checked whether the speed change operation is done for shifting up or not, in step P3. If the speed change operation is done for shifting up, it is checked based on the detection output signal St whether throttle opening degree Th is equal to or more than 50% or not, in step P4. If the throttle opening degree Th is equal to or more than 50%, it is checked based on the detection output signal Sw whether cooling water temperature Tw in the vehicle engine 1 is equal to or higher than 72° C. or not, in step P5. If the cooling water temperature Tw is equal to or higher than 72° C., the command signal Sj is commenced to be sent out, in step P6 and a counted value C of a counter contained in the transmission control unit 12 is increased by 1, in step P7.

Then, in step P8, it is checked whether the counted value C is equal to or larger than a predetermined value Ct which corresponds to the period Tt or not. If the counted value C is smaller than the predetermined value Ct, the process returns to the step P1. On the other hand, the counted value C is equal to or larger than the predetermined value Ct, the command signal Sj is terminated to be sent out, in step P9. After that, in step P10, the counter is stopped to operate and the counted value C is set to be 0, then the process returns to the step P1.

In the case where the speed change operation has not been commenced as a result of the check in the step P2, the speed change operation is not done for shifting up as a result of the check in the step P3, the throttle opening degree Th is less the 50% as a result of the check in the step P4, or the cooling water temperature Tw is lower than 72° C. as a result of the check in the step P5, it is checked whether the counted value C of the counter is 0 or not, in step P11. If the counted value C is not 0, the process advances to the step P9 directly from the step P11, and if the counted value C is 0, the process returns to the step P1.

Figure 6:
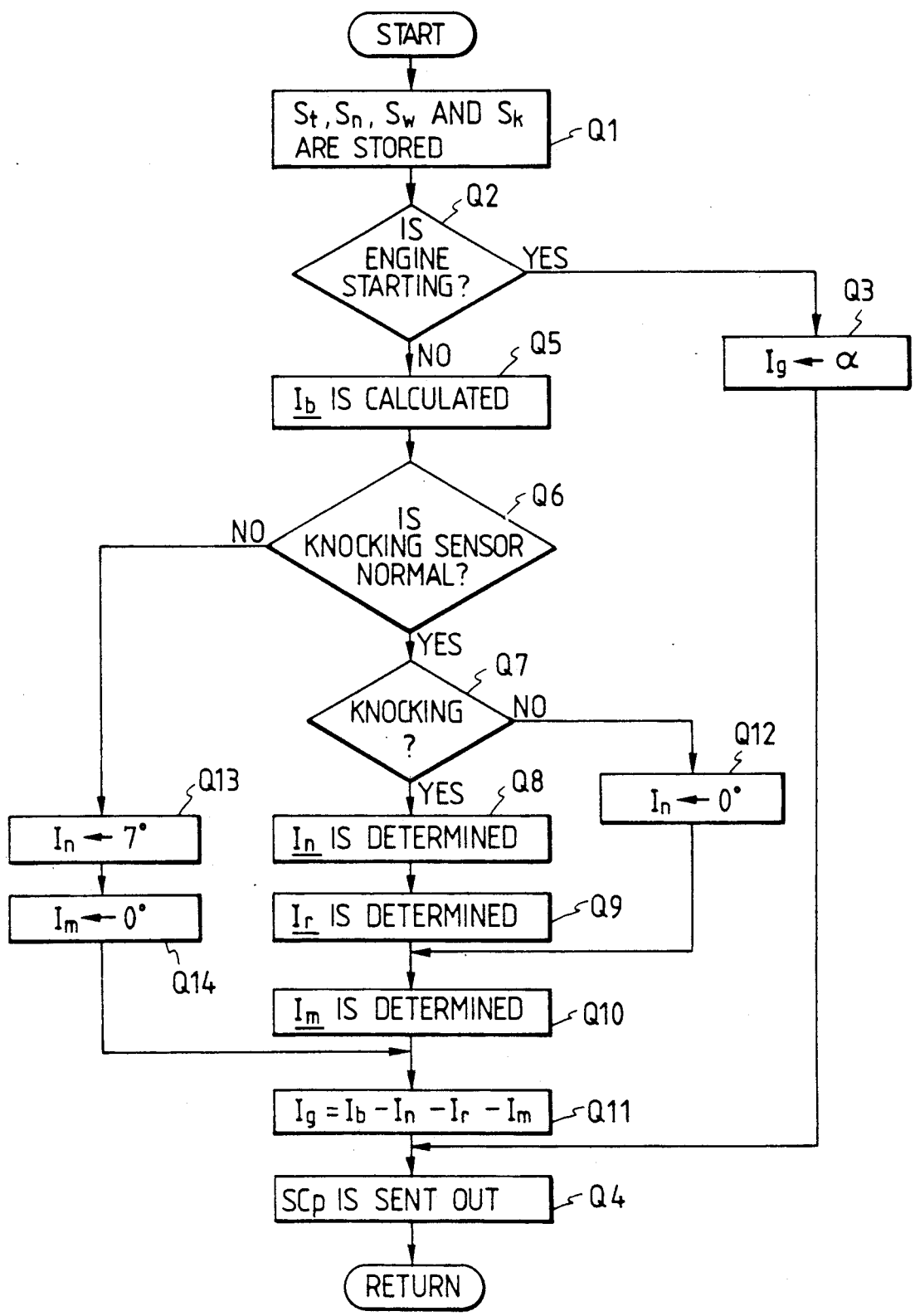

One example of an operation program for the ignition timing control is carried out in the microcomputer contained in the engine control unit 13 in accordance with a flow chart shown in FIG. 6.

According to the flow chart in FIG. 6, first, in step Q1, the detection output signals St, Sn, Sw and Sk are stored, and then, it is checked whether the vehicle engine 1 is in process of starting or not, in step Q2. If the vehicle engine 1 is in process of starting, a final angle Ig of crank rotation corresponding to an actual ignition timing is set to be $\alpha$, in step Q3, and the process advances to step Q4. To the contrary, if the engine is not in process of starting as a result of the check in the step Q2, a fundamental advanced angle Ib of crank rotation corresponding to a fundamental ignition timing is calculated based on the engine speed represented by the detection output signal Sn and the throttle opening degree represented by the detection output signal St, in step Q5.

Next, in step Q6, it is checked whether the knocking sensor 26 is normal or not. If the knocking sensor 26 is normal, it is checked based on the detection output signal Sk whether the knocking arises in the vehicle engine 1 or not, in step Q7. If it is clarified in the step Q7 that the knocking arises in the vehicle engine 1, a first retarding angle $\underline{In}$ of crank rotation is determined in connection with the knocking, in step Q8. Then, a second retarding angle $\underline{In}$ of crank rotation is determined in connection with fuel in the vehicle engine 1 in step Q9, and a third retarding angle Im of crank rotation is determined in connection with the speed change operation carried out in the automatic transmission 2, in step Q10.

After that, in step Q11, the final angle Ig is calculated by subtracting the first, second and third retarding angles $\underline{In}$, Ir and Im from the fundamental advanced angle Ib, and the process advances to the step Q4.

If it is clarified in the step Q7 that the knocking does not arise in the vehicle engine 1, the first retarding angle $\underline{In}$ is set to be 0°, in step Q12, and then, the process advances to the step Q10 directly. Further, if it is clarified in the step Q6 that the knocking sensor 26 is not in a normal state, the first retarding angle $\underline{In}$ is set to be 7°, in step Q13, and the third retarding angle Im is set to be 0°, in step Q14. Then, the process advances to the step Q11 from the step Q14 directly.

In the step Q4, the ignition control signal SCp which corresponds to the final angle Ig obtained in the step Q3 or Q11 is produced and sent out to the igniter 10, and thereafter, the process returns to the step Q1.

Figure 7:
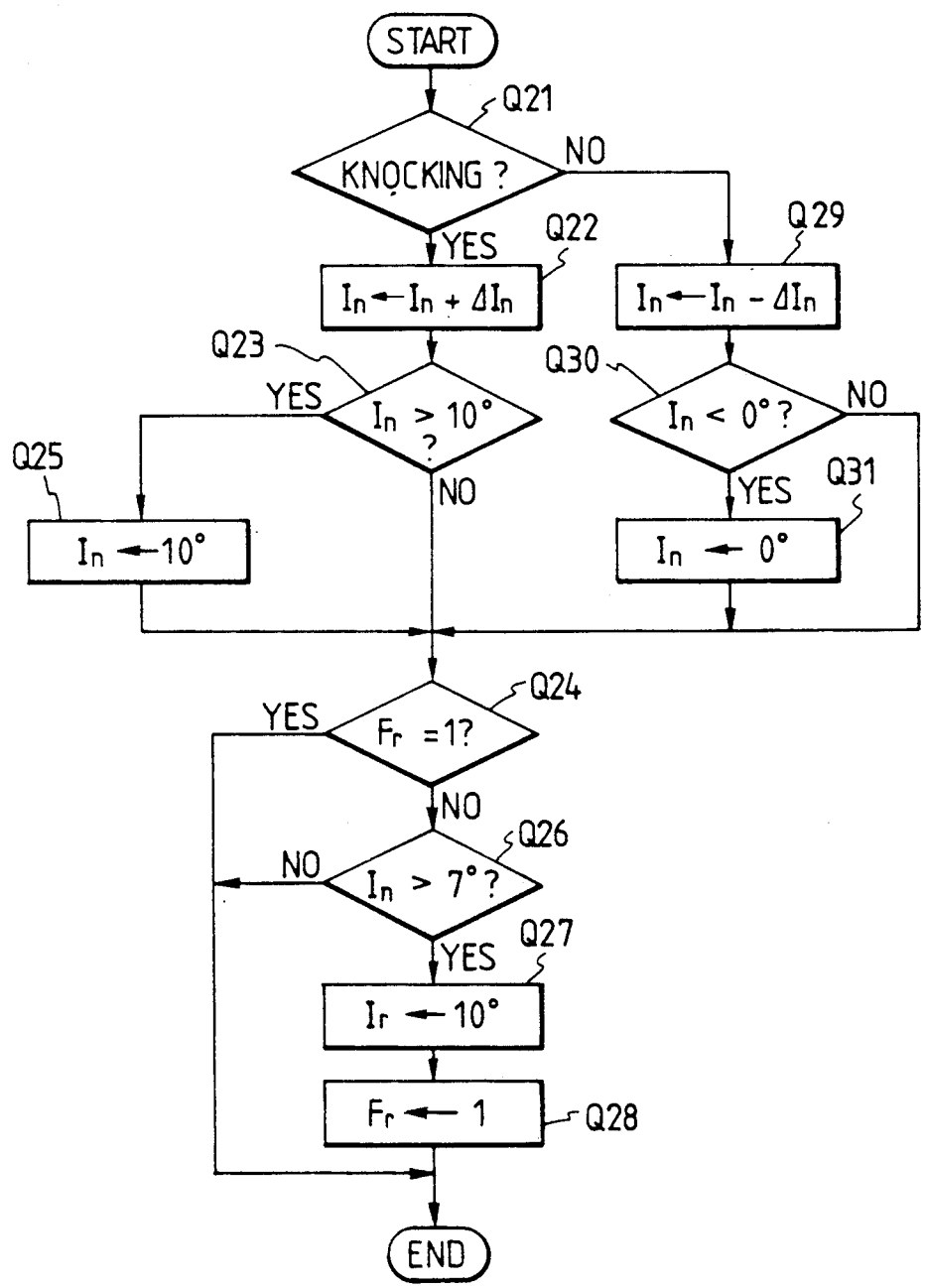

The operation for determining the first and second retarding angles $\underline{In}$ and Ir in the steps Q8 and Q9 of the flow chart shown in FIG. 6 is conducted in accordance with, for example, a flow chart shown in FIG. 7.

According to the flow chart shown in FIG. 7, in step Q21, it is checked based on the detection output signal Sk whether the knocking arises in the vehicle engine 1 or not. If the knocking arises, the first retarding angle $\underline{In}$ is renewed by adding a supplemental angle $\Delta In$ set to be a predetermined value, for example, 1°, in step Q22, and it is checked whether the first retarding angle $\underline{In}$ renewed in the step Q22 is larger than 10° or not, in step Q23. If the first retarding angle $\underline{In}$ renewed in the step Q22 is larger than 10°, the first retarding angle $\underline{In}$ is set to be 10°, in step Q25, and then the process advances to step Q24. If the first retarding angle $\underline{In}$ renewed in the step Q22 is not larger than 10°, the process advances to the step Q24 directly from the step Q22.

In the step Q24, it is checked whether a flag Fr is set to be 1 or not. When the flag Fr is set to be 0, it is checked whether the first retarding angle $\underline{In}$ is larger than 7° or not, in step Q26. If the first retarding angle $\underline{In}$ is larger than 7°, the second retarding angle Ir is set to be 10° in step Q27, and the flag Fr is set to be 1 in step Q28. Then, the process is terminated. On the other hand, when the flag Fr is set to be 1 as a result of the check in the step Q24 or the first retarding angle $\underline{In}$ is not larger than 7° as a result of the check in the step Q26, the process is terminated.

When it is clarified in the step Q21 that the knocking does not arise in the vehicle engine 1, the first retarding angle $\underline{In}$ is renewed by subtracting the supplemental angle $\Delta In$, in step Q29, and it is checked whether the first retarding angle $\underline{In}$ renewed in the step Q29 is smaller than 0°, namely, negative or not, in step Q30. If the first retarding angle $\underline{In}$ renewed in the step Q29 is smaller than 0°, the first retarding angle $\underline{In}$ is set to be 0°, in step Q31, and then the process advances to the step Q24. If the first retarding angle $\underline{In}$ renewed in the step Q29 is equal to or larger than 0°, the process advances to the step Q24 directly from the step Q30.

Each of the second retarding angle Ir and the flag Fr is set to be 0 in an initial arrangement taken in the operation program for the ignition timing control carried out in accordance with the flow chart shown in FIG. 6.

Figure 8:
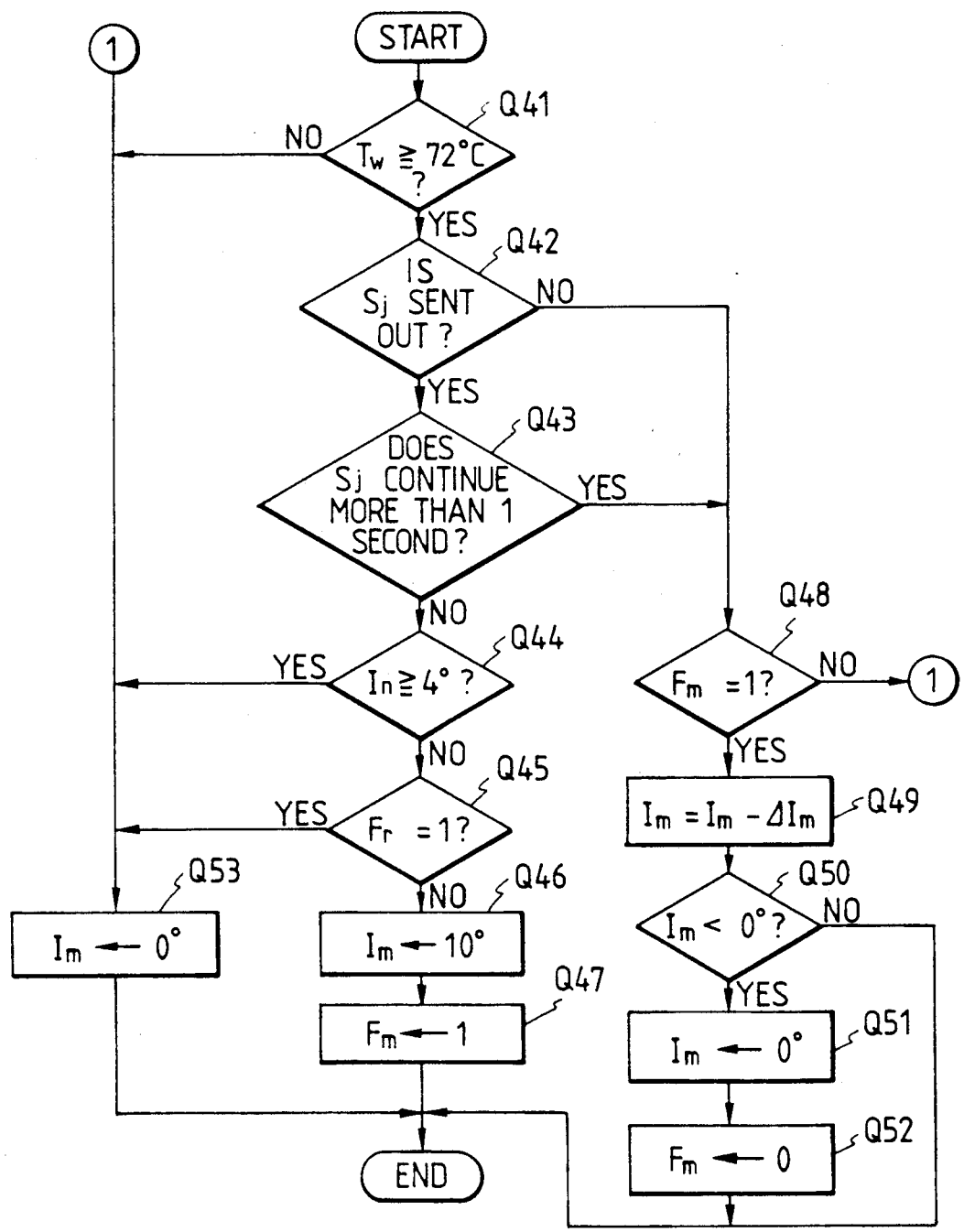

The operation for determining the third retarding angles Im in the steps Q10 of the flow chart shown in FIG. 6 is conducted in accordance with, for example, a flow chart shown in FIG. 8.

According to the flow chart shown in FIG. 8, in step Q41, it is checked based on the detection output signal Sw whether the cooling water temperature Tw in the vehicle engine 1 is equal to or higher than 72° C. or not. When the cooling water temperature Tw is equal to or higher than 72° C., it is checked whether the command signal Sj is sent out or not, in step Q42. In the case where the command signal Sj is sent out, it is further checked whether the command signal Sj has been sent out continuously for more than 1 second or not, in step Q43. If the command signal Sj has not been sent out continuously for more than 1 second, it is checked whether the first retarding angle $\underline{In}$ is equal to or larger than 4° or not, in step Q44. If the first retarding angle $\underline{In}$ is smaller than 4°, it is checked whether the flag Fr is set to be 1 or not, in step Q45. When the flag Fr is set to be 0, the third retarding angle Im is set to be 10° in step Q46, and a flag Fm is set to be 1 in step Q47. Then, the process is terminated.

If the cooling water temperature Tw is lower than 72° C. as a result of the check in the step Q41, the first retarding angle $\underline{In}$ is equal to or larger than 4° as a result of the check in the step Q44, or the flag Fr is set to be 1 as a result of the check in the step Q45, the third retarding angle Im is set to be 0° in step Q53, and then the process is terminated.

On the other hand, if the command signal Sj is not sent out as a result of the check in the step Q42 or the command signal Sj has been sent out continuously for more than 1 second as a result of the check in the step Q43, it is checked whether the flag Fm is set to be 1 or not, in step Q48. When the flag Fm is set to be 1, the third retarding angle Im is renewed by subtracting a supplemental angle $\Delta Im$ set to be a predetermined value, for example, 1°, in step Q49, and it is checked whether the third retarding angle Im renewed in the step Q49 is smaller than 0°, namely, negative or not, in step Q50. If the third retarding angle Im renewed in the step Q49 is smaller than 0°, the third retarding angle Im is set to be 0°, in step Q51, and the flag Fm is set to be 0, in step Q52. Then, the process is terminated. If the third retarding angle Im renewed in the step Q49 is equal to or larger than 0°, the process terminated.

Further, when the flag Fm is set to be 0 as a result of the check in the step Q48, the process advances to the step Q53.

Figure 9:
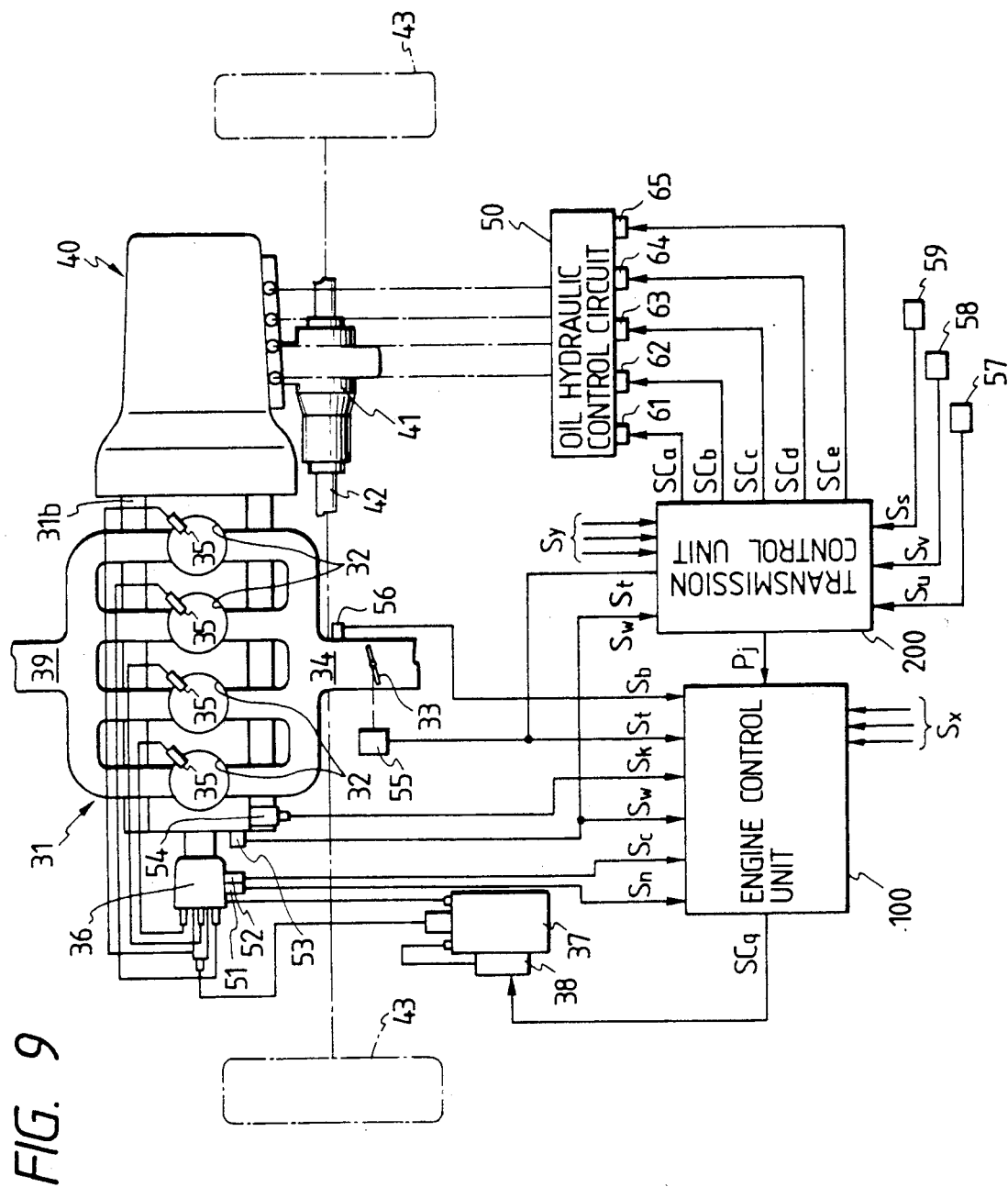
FIG. 9 is a schematic illustration showing another embodiment of control system for a vehicle engine coupled with an automatic transmission according to the present invention, together with essential portions of an engine to which the embodiment is applied.

FIG. 9 illustrates a second embodiment of control system for a vehicle engine coupled with an automatic transmission according to the present invention, together with a vehicle engine which is mounted on a vehicle of the front engine—front drive type and to which the second embodiment is applied.

Referring to FIG. 9, a vehicle engine 31 has four cylinders 32 each supplied with air-fuel mixture through an intake passage 34 provided with a throttle valve 33. The air-fuel mixture taken in each of the cylinders 32 is subjected to combustion caused by the operation of an ignition system including spark plugs 35, a distributor 36, an ignition coil 37 and an igniter 38, and exhaust gas resulted from the combustion is discharged through an exhaust passage 39. With such combustion of the air-fuel mixture in each of the cylinders 32, a torque is produced on a crank shaft of the vehicle engine 31. The torque obtained from the vehicle engine 31 is transmitted through an automatic transmission 40 which is coupled with the vehicle engine 31, a differential gear mechanism 41 and a front axle 42 to a couple of front wheels 43.

Figure 10:
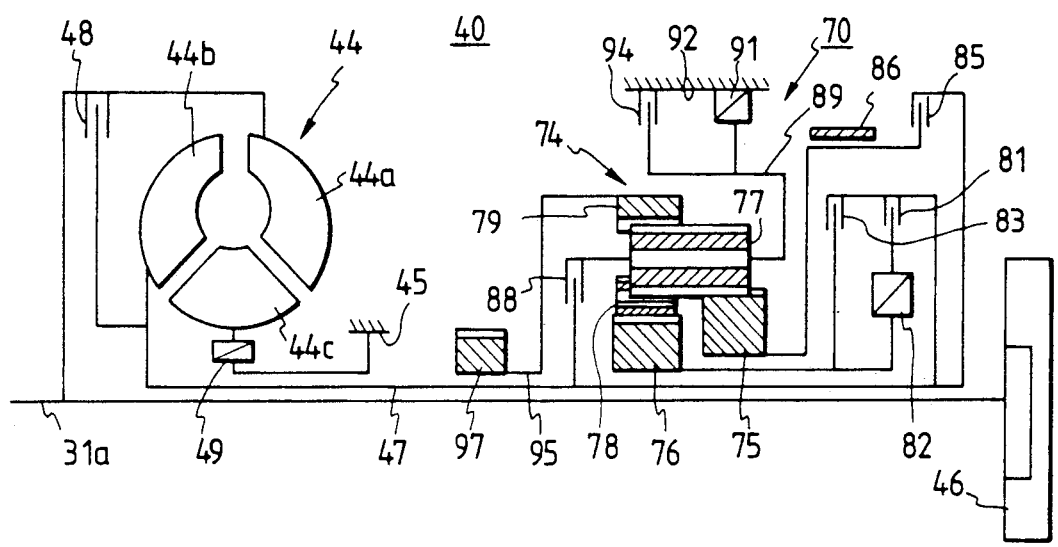
FIG. 10 is a schematic illustration showing an example of an automatic transmission accompanying with the engine to which the embodiment shown in FIG. 9 is applied.

The automatic transmission 40 is accompanied with an oil hydraulic control circuit 50 provided with solenoid valves 61, 62, 63, 64 and 65 for supplying various portions of the automatic transmission 40 selectively with operating oil pressure and, as shown in FIG. 10, comprises a torque converter 44 and a power transmitting gear arrangement 70. The torque converter 44 comprises a pump impeller 44a, a turbine runner 44b, a stator 44c and a case 45. The pump impeller 44a is secured to a crank shaft 31a of the vehicle engine 31 on which an oil pump 46 is mounted. The turbine runner 44b is coupled through a tubular turbine shaft 47 with the power transmitting gear arrangement 70 and coupled also through a lock-up clutch 48 with the crank shaft 31a. The stator 44c is coupled rotatably through a one-way clutch 49 with the case 45 and the one-way clutch 49 permits the stator 44c to revolve only in a direction common to the revolution of the pump impeller 44a.

The power transmitting gear arrangement 70 is provided with a planetary gear unit 74 for obtaining four forward speeds and one reverse speed. The planetary gear unit 74 comprises a large sun gear 75, a small sun gear 76, a long pinion gear 77, a short pinion gear 78 and a ring gear 79. A series connection of a forward clutch 81 for forward traveling and a one-way clutch 82 is disposed in parallel with a coast clutch 83 between the large sun gear 75 and the tubular turbine shaft 47. A reverse clutch 85 for reverse traveling and a 2-4 brake device 86 are connected in series between the small sun gear 76 and the tubular turbine shaft 47. A 3-4 clutch 88 is provided between the long pinion gear 77 and the tubular turbine shaft 47, and the long pinion gear 77 is coupled through a carrier 89 of the planetary gear unit 74 and a one-way clutch 91 with a case 92 of the power transmitting gear arrangement 70. The carrier 89 is selectively engaged through a low/reverse brake device 94 with the case 92. The ring gear 79 is connected through an output shaft 95 of the planetary gear unit 74 to an output gear 97, so that the torque obtained on the output shaft 95 is transmitted through idlers or the like to the differential gear mechanism 41.

In the power transmitting gear arrangement 70 constituted as described above, a plurality of shift ranges including P (parking) range, R (reverse) range, N (neutral) range, D (driving) range, 1st range and 2nd range, and a plurality of speeds including 1st to 4th speeds at the D range, 1st to 3rd speeds at the 2nd range, and 1st and 2nd speeds at the 1st range, are obtained by causing the forward clutch 81, coast clutch 83, reverse clutch 85, 3-4 clutch 88, 2-4 brake device 86 and low/reverse brake device 94, each of which is formed into an engaging friction element, to work selectively.

In the following Table 1, there are given the relationship in operation of the respective shift ranges and speeds with the clutches and brake devices in the above configuration:

TABLE 1

| Shift range | | Clutch | | | | Brake device | | One-way clutch | |
|---|---|---|---|---|---|---|---|---|---|
| | | 81 | 83 | 88 | 85 | 86 | 94 | 82 | 91 |
| P | | | | | | | | | |
| R | | | | | o | | o | | |
| N | | | | | | | | | |
| D | 1st speed | o | | | | | | o | o |
| | 2nd speed | o | | | | o | | o | |
| | 3rd speed | o | o | o | | | | o | |
| | 4th speed | o | | o | | o | | (o) | |
| 2nd | 1st speed | o | | | | | | o | o |
| | 2nd speed | o | o | | | o | | o | |
| | 3rd speed | o | o | o | | | | o | |
| 1st | 1st speed | o | o | | | | o | o | |
| | 2nd speed | o | o | | | o | | o | |

In Table 1, each circular mark:o represents that the device is held in engagement to transmit power and a parenthesized circular mark:(o) represent that the device is held in engagement without participating in power transmission.

The operating oil pressure for working each of the clutches 81, 83, 88 and 85 and the brakes 86 and 94 is produced in the oil hydraulic control circuit 50.

In the embodiment shown in FIG. 9, an engine control unit 100 which contained a microcomputer and a transmission control unit 200 which contains also a microcomputer are provided for controlling the operation of a combination of the vehicle engine 31 and the automatic transmission 40 constituted as described above.

The engine control unit 100 is supplied with a detection output signal Sn obtained from an engine speed sensor 51 provided on the distributor 36, a detection output signal Sc obtained from a crank angle sensor 52 provided on the distributor 36, a detection output signal Sw obtained from a temperature sensor 53 provided on an engine block 31b, a detection output signal Sk obtained from a knocking sensor 54 provided on the engine block 31b, a detection output signal St obtained from a throttle sensor 55, a detection output signal Sb obtained from a negative pressure sensor 56 disposed at a portion of the intake passage 34 downstream to the throttle valve 33 and other necessary detection output signals Sx, and operative to generate an ignition control signal SCq based on the detection output signals Sn, Sc, Sw, Sk, St and Sb and a command pulse signal Pj which is supplied selectively to the engine control unit 100 from the transmission control unit 200 and to supply the igniter 38 with the ignition control signal SCq so as to perform an ignition timing control.

The transmission control unit 200 is supplied with the detection output signal Sw from the temperature sensor 53, the detection output signal St from the throttle sensor 55, a detection output signal Su obtained from a turbine speed sensor 57, a detection output signal Sv obtained from a speed sensor 58, a detection output signal Ss obtained from a shift position sensor 59 and other necessary detection output signals Sy, and operative to supply the solenoid valves 61 to 65 respectively with driving pulse signals SCa, SCb, SCc, SCd and SCe produced based on the detection output signals Sw, St, Su, Sv and Ss so as to perform a speed change control for the automatic transmission 40 in which each of the clutches 81, 83, 88 and 85 and the brakes 86 and 94 is selectively engaged in such a manner as shown in Table 1.

Figure 11:
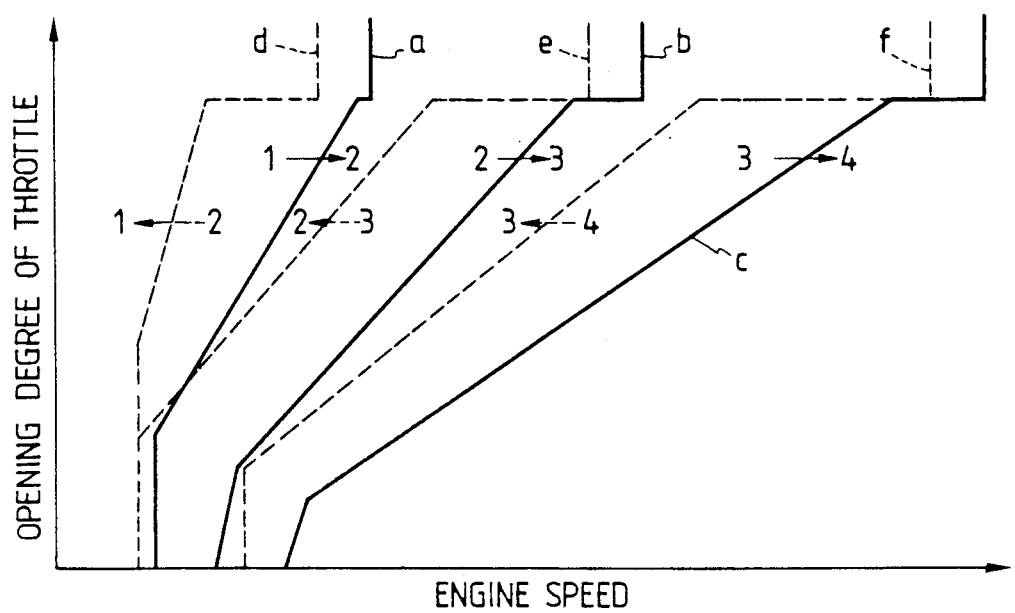
FIG. 11 shows a speed change characteristic map used for explaining the operation of the embodiment shown in FIG. 9.

On the occasion of the speed change control, in the transmission control unit 200, the throttle opening degree represented by the detection output signal St and the traveling speed of the vehicle represented by the detection output signal Sv are checked up on shifting-up and shifting-down lines in a predetermined speed change characteristic map, for example, as shown in FIG. 11, which has shifting-up lines a, b, and c for first to second shifting up (1→2), second to third shifting up (2→3) and third to fourth shifting up (3→4), respectively and shifting-down lines d, e and f for second to first shifting down (2→1), third to second shifting down (3→2) and fourth to third shifting down (4→3), and a first to second, second to third or third to fourth shifting-up operation or a second to first, third to second or fourth to third shifting-down operation is detected based on a result of the checking up.

When the shifting-down operation is detected under a condition in which the vehicle engine 31 is operating with, for example, the throttle opening degree which is equal to or larger than $TH_1$ corresponding to one eighth the maximum value and the cooling water temperature which is equal to or higher than $TW_1$ set to be equal to or higher than 70° C., the command pulse signal Pj is supplied to the engine control unit 100 from the transmission control unit 200 after a predetermined period, for example, 100 msec, which is selected to correspond to time lag in operation of the power transmitting gear arrangement 70, has elapsed since the shifting-down operation was detected, on the condition that a different shifting-up or shifting-down operation is not detected in the predetermined period.

In the ignition timing control by the engine control unit 100, a fundamental advanced angle of crank rotation corresponding to a fundamental ignition timing is determined based on the engine speed represented by the detection output signal Sn and the negative pressure in the intake passage represented by the detection output signal Sb, and when the command pulse signal Pj is supplied to the engine control unit 100 from the transmission control unit 200, a first retarding angle of crank rotation is provided for causing an actual ignition timing to be retarded compared with the fundamental ignition timing so as to suppress torque shock resulting from the speed change operation carried out in the automatic transmission 40. Further, when the knocking in the vehicle engine 31 represented by the detection output signal Sk is larger in magnitude than a predetermined value, a second retarding angle of crank rotation is provided for causing the actual ignition timing to be retarded compared with the fundamental ignition timing so as to suppress the knocking.

Under a condition in which the speed change control and the ignition timing control are thus carried out by the transmission control unit 200 and the engine control unit 100, respectively, in the case where a throttle opening degree Th is commenced to increase at a time point $t_0'$ and the shifting-down operation is detected at a time point $t_1'$, as shown in FIG. 12A, the command pulse signal Pj is supplied to the engine control unit 100 from the transmission control unit 200 at a time point $t_2'$ after a predetermined period Ta, which is selected to correspond to time lag in operation of the power transmitting gear arrangement 70, has lapsed from the time point $t_1'$, as shown in FIG. 12B, and a retarding angle $\theta A$ is set to have an initial value $\theta a$ at the time point $t_2'$, as shown in FIG. 12C. The retarding angle $\theta A$ is maintained to be $\theta a$ during a period Tr from the time point $t_2'$ to a time point $t_3'$ in which the clutches 81, 83, 88 and 85 and the brakes 86 and 94 in the power transmitting gear arrangement 70 work selectively for the speed change operation, and then reduced step by step by a small angle $\Delta\theta$ at each step after the time point $t_3'$ so as to be zero at a time point $t_4'$ as shown in FIG. 12C. An effective angle $\theta$ of crank rotation corresponding to the actual ignition timing is obtained by subtracting the retarding angle $\theta A$ from the fundamental advanced angle, so that a spark advance is reduced by the retarding angle $\theta A$ in a period from the time point $t_2'$ to the time point $t_4'$. Accordingly, a torque TR obtained on the output shaft 95 of the automatic transmission 40 is reduced after the time point $t_2'$, as shown by a solid line in FIG. 12D, compared with a torque obtained without the reduction in spark advance as shown in a broken line in FIG. 12D, so that the torque shock resulting from the shifting-down operation is suppressed effectively.

In the case where the command pulse signal Pj is supplied to the engine control unit 100 from the transmission control unit 200 and thereby the retarding angle $\theta A$ is set to have the initial value $\theta a$ at the time point $t_1''$, as shown in FIGS. 13A and 13B, and a knocking which is larger in magnitude than a predetermined value arises in the vehicle engine 31 at a time point $t_2''$ immediately after the time point $t_1''$, a retarding angle $\theta K$ of crank rotation is provided to have an initial value corresponding to the magnitude of the knocking, as shown in FIG. 13C. In such a case, a final retarding angle $\theta R$ of crank rotation is formed with one of the retarding angles $\theta A$ and $\theta K$ which is larger than the other of the retarding angles $\theta A$ and $\theta K$, as shown in 13D, and the effective angle $\theta$ corresponding to the actual ignition timing is obtained by subtracting the final retarding angle $\theta R$ from the fundamental angle $\theta B$. Accordingly, the final retarding angle $\theta R$ is prevented from being large excessively, such as shown by a broken line in FIG. 13D, under a condition in which the retarding angles $\theta A$ and $\theta K$ are provided simultaneously and therefore the output of the vehicle engine 31 is prevented from being reduced in excess of necessity.

In the case where the shifting-down operation is detected at a time point $t_a$ and the command pulse signal Pj is supplied to the engine control unit 100 from the transmission control unit 200 so that the retarding angle $\theta A$ is set to have the initial value $\theta a$ at a time point $t_b$ after the predetermined period Ta has lapsed from the time point $t_a$, as shown in FIGS. 14A and 14B, and then a further shifting-down operation is newly detected at a time point $t_c$ immediately after the time point $t_b$, the command pulse signal Pj is again supplied to the engine control unit 100 from the transmission control unit 200 and the retarding angle $\theta A$ is reset to have the initial value $\theta a$ at a time point $t_d$ after the predetermined period Ta has lapsed from the time point $t_c$, as shown in FIGS. 14A and 14B. Accordingly, the control for suppressing torque shock caused by each shifting-down operation is surely achieved.

Further, in the case where the first shifting-down operation is detected at a time point $t_a'$ and the second shifting-down operation is detected at a time point $t_b'$ before a time point $t_c'$ at which the predetermined period Ta has lapsed from the time point $t_a'$, as shown in FIGS. 15A and 15B, the command pulse signal Pj is not supplied to the engine control unit 100 from the transmission control unit 200 at the time point $t_c'$ but supplied to the engine control unit 100 from the transmission control unit 200 at the time point $t_d'$ after the predetermined period Ta has lapsed from the time point $t_b'$, as shown in FIGS. 15A and 15B. Consequently, the control for suppressing torque shock caused by each shifting-down operation is surely achieved under a condition in which the shifting-down operation is repeated in a relatively short period.

The control for suppressing the torque shock resulting from the speed change operation as described above is not carried out when the shifting-up operation is detected because it is not feared that the shifting-up operation brings about a relatively large torque shock on the output shaft 95 of the automatic transmission 40.

The above described speed change control by the transmission control unit 200 is effected mainly by the microcomputer contained in the transmission control unit 200 and the ignition timing control by the engine control unit 100 is effected mainly by the microcomputer contained in the engine control unit 100.

Figure 16:
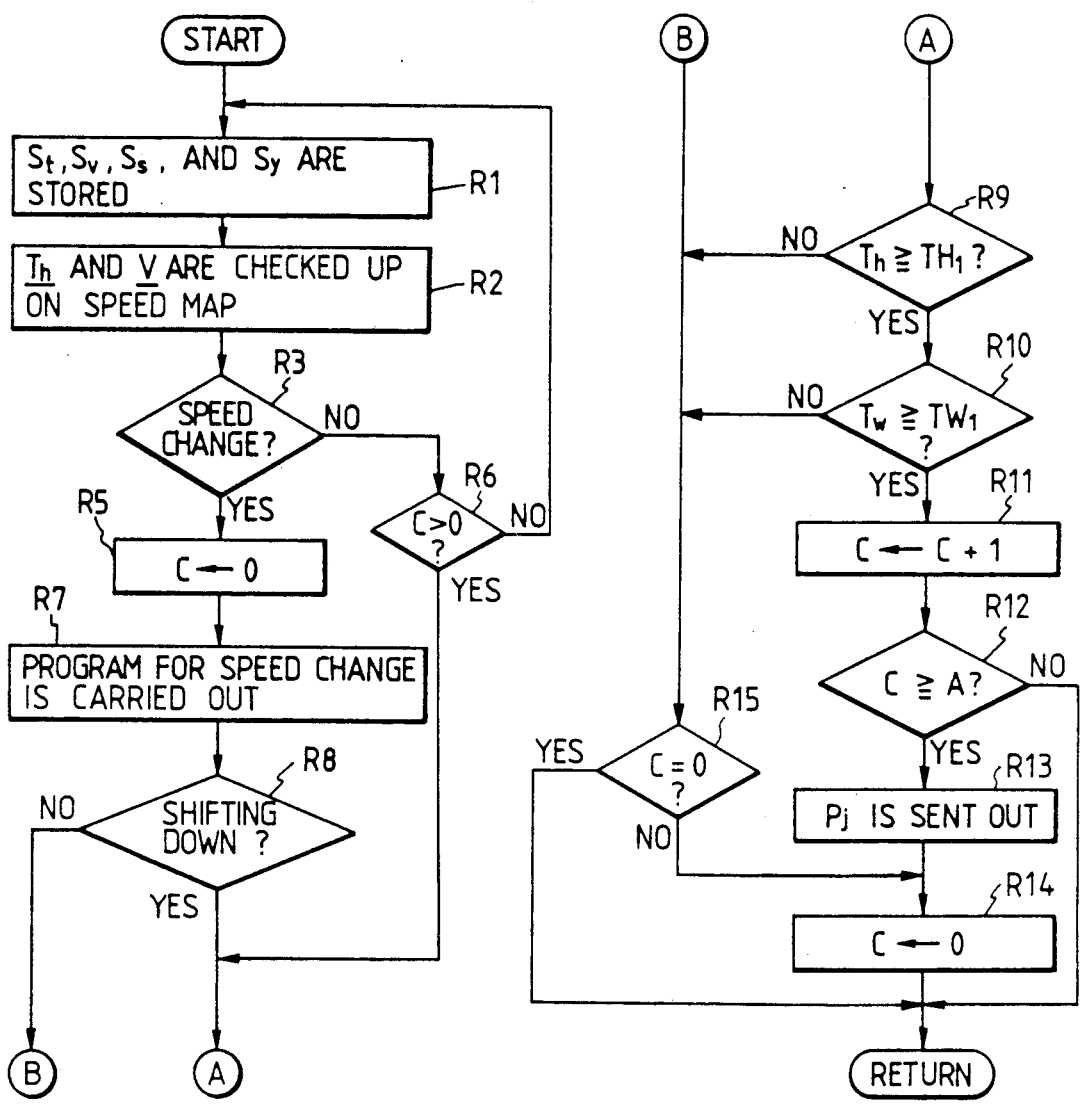

One example of an operation program for the speed change control is carried out in the microcomputer contained in the transmission control unit 200 in accordance with a flow chart shown in FIG. 16.

According to the flow chart in FIG. 16, first, in step R1, the detection output signals St, Sv, Ss and Sy are stored, and in step R2, throttle opening degree Th represented by the detection output signal St and vehicle traveling speed V represented by the detection output signal Sv are checked up on a speed change characteristic map, such as shown in FIG. 11, memorized in a memory contained in the transmission control unit 200. Then, in step R3, it is checked, based on a result of the checking up in the step R2, whether a speed change operation is to be performed or not. If the speed change operation is to be performed, a counted value C of a counter contained in the transmission control unit 200 is set to be 0, in step R5, and an operation program for speed change is carried out, in step R7.

After that, in step R8, it is checked whether the speed change operation is conducted for shifting down or not. When it is clarified in the step R8 that the speed change operation is conducted for shifting down, it is checked whether the throttle opening degree Th is equal to or larger than $TH_1$ or not, in step R9. If the throttle opening degree Th is equal to or larger than $TH_1$, it is checked whether cooling water temperature Tw represented by the detection output signal Sw is equal to or higher than $TW_1$ or not, in step R10. If the cooling water temperature Tw is equal to or higher than $TW_1$, the counted value C is increased by 1, in step R11.

Then, in step R12, it is checked whether the counted value C is equal to or larger than a predetermined value A which corresponds to the predetermined period Ta or not. If the counted value C is smaller than the predetermined value A, the process returns to the step R1. On the other hand, the counted value C is equal to or larger than the predetermined value A, the command pulse signal Pj is sent out, in step R13. After that, in step R14, the counter is stopped to operate and the counted value C is set to be 0, then the process returns to the step R1.

When it is clarified in the step R3 that the speed change operation is not to be performed, it is checked whether the counted value C is larger than 0 or not, in step R6. If the counted value C is 0, the process returns to the step R1, and if the counted value C is larger than 0, the process advances to the step R9.

Further, in the case where the speed change operation is not conducted for shifting down as a result of the check in the step R8, the throttle opening degree Th is smaller than $TH_1$ as a result of the check in the step R9, or the cooling water temperature Tw is lower than $TW_1$ as a result of the check in the step R10, it is checked whether the counted value C is 0 or not, in step R15. If the counted value C is not 0, the process advances to the step R14 directly, and if the counted value C is 0, the process returns to the step R1.

One example of an operation program for the ignition timing control is carried out in the microcomputer contained in the engine control unit 100 in accordance with a flow chart shown in FIGS. 17a and 17b.

According to the flow chart in FIGS. 17a and 17b, first, in step R21, the detection output signals Sn, Sc, Sw, Sk, Sb, St and Sx are stored, and then, the fundamental advanced angle $\theta B$ of crank rotation corresponding to the fundamental ignition timing is calculated based on the engine speed represented by the detection output signal Sn and the negative pressure in the intake passage represented by the detection output signal Sb, in step R22.

Next, in step R23, it is checked whether throttle opening degree Th represented by the detection output signal St is equal to or larger than $TH_1$ or not. If the throttle opening degree Th is equal to or larger than $TH_1$, it is further checked whether cooling water temperature Tw is equal to or higher than $TW_1$, in step R24. When the cooling water temperature Tw is equal to or higher than $TW_1$, it is checked whether the command pulse signal Pj has been sent out or not, in step R26.

If it is clarified in the step R26 that the command pulse signal Pj has been sent out, the retarding angle $\theta A$ is set to have the initial value $\theta a$ in step R27, and a flag FR is set to be 1 in step R28. After that, a counted value U of a counter contained in the engine control unit 100 is set to be 0 in step R29, and the process advances to step R31.

In the step R31, the retarding angle $\theta K$, which is determined in another operation program for determining the retarding angle described later, is stored. Then, in step R32, it is checked whether the retarding angle $\theta A$ is larger than the retarding angle $\theta K$ or not. If the retarding angle $\theta A$ is larger than the retarding angle $\theta K$, the retarding angle $\theta A$ is adopted as the final retarding angle $\theta R$, in step R33, and if the retarding angle $\theta A$ is equal to or smaller than the retarding angle $\theta K$, the retarding angle $\theta K$ is adopted as the final retarding angle $\theta R$, in step R34.

After the retarding angle $\theta A$ or $\theta K$ is adopted as the final retarding angle $\theta R$, the effective angle $\theta$ of crank rotation corresponding to the actual ignition timing is calculated by subtracting the final retarding angle $\theta R$ from the fundamental advanced angle $\theta B$, in step R35. Then, in step R36, the ignition control signal SCq which corresponds to the effective angle $\theta$ obtained in the step R35 is produced and sent out to the igniter 38, and thereafter, the process returns to the step R21.

In the case where the throttle opening degree Th is smaller than $TH_1$ as a result of the check in the step R23 or the cooling water temperature Tw is lower than $TW_1$ as a result of the check in the step R24, the flag FR is set to be 0 in step R37 and the retarding angle θA is set to be 0° in step R38. Then, the process advances to the step R31.

Further, when it is clarified in the step R26 that the command pulse signal Pj has not been sent out, it is checked whether the flag FR is set to be 1 or not, in step R40. If the flag FR is set to be 0, the process advances to the step R38, and if the flag FR is set to be 1, the process advances to step R41.

In the step R41, the counted value U is increased by 1, and then it is checked whether the counted value U is equal to or larger than a predetermined value E which is set to correspond to the period Tr, in step R42. If the counted value U is equal to or larger than the predetermined value E, the retarding angle θA is renewed by subtracting the small angle Δθ, in step 43, and it is checked whether the retarding angle θA renewed in the step R43 is smaller than 0°, namely, negative or not, in step R44. If the retarding angle θA renewed in the step R43 is smaller than 0°, the retarding angle θA is set to be 0° in step R45, and the flag FR is set to be 0 in step R46, then the process advances to the step R32. If the retarding angle θA is equal to or larger than 0 as a result of the check in the step R44, the process advances to the step R46 directly from the step R44. Further, if the counted value U is smaller than the predetermined value E, the process advances to the step R32 directly from the step R42.

Figure 18:
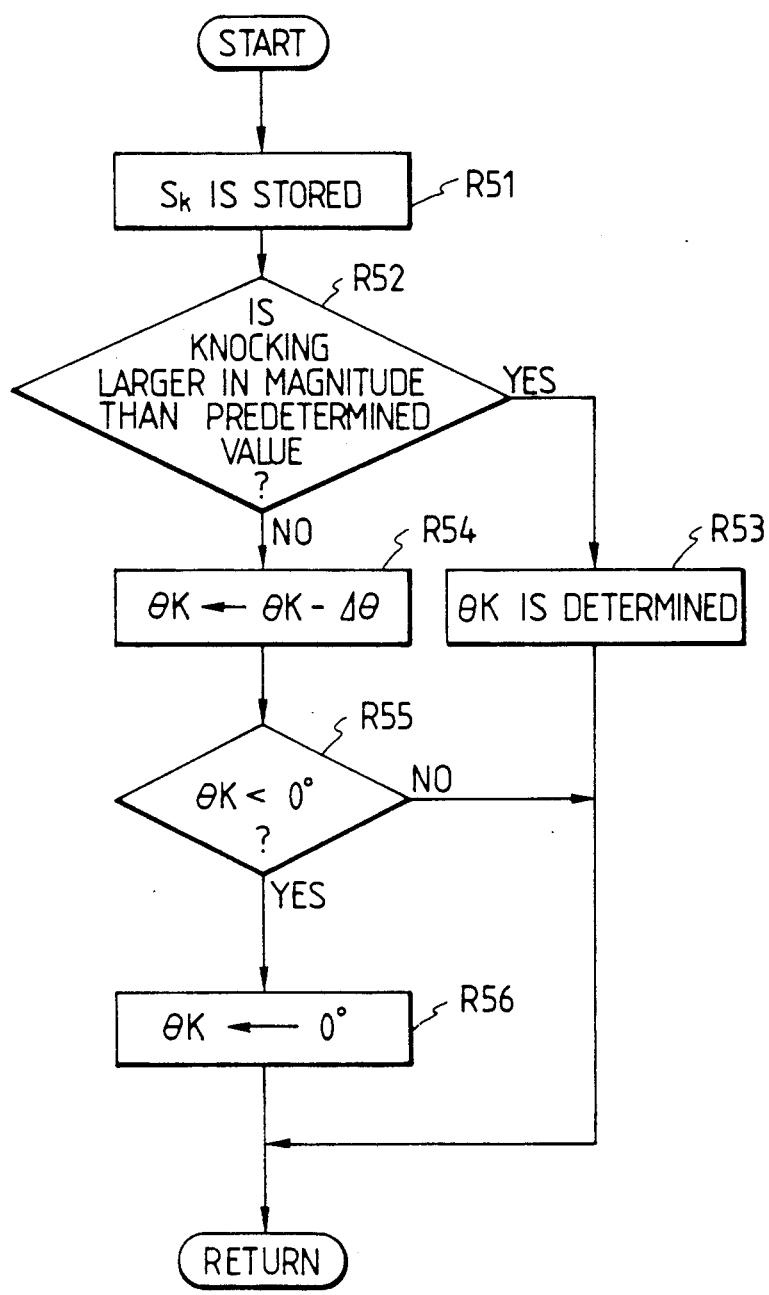

The operation program for determining the retarding angles θK is carried out in accordance with a flow chart shown in FIG. 18 in the microcomputer contained in the engine control unit 100.

According to the flow chart shown in FIG. 18, in step R51, the detection output signal Sk is stored, and it is checked based on the detection output signal Sk whether the knocking in the vehicle engine 31 is larger in magnitude than a predetermined value or not, in step R52. If the knocking in the vehicle engine 31 is larger in magnitude than the predetermined value, the retarding angle θK is determined in response to the magnitude of the knocking, in step R53, and the process returns to the step R51.

To the contrary, when it is clarified in the step R52 that the knocking in the vehicle engine 31 is not larger in magnitude than the predetermined value, the retarding angle θK is renewed by subtracting the small angle Δθ, in step R54. Then, it is checked whether the retarding angle θK is smaller than 0°, namely, negative or not, in step R55. If the retarding angle θK is smaller than 0°, the retarding angle θK is set to be 0°, in step R56, and then the process returns to the step R51. Further, if the retarding angle θK is equal to or larger than 0° as a result of the check in the step R55, the process returns to the step R51 directly from the step R55.

Although the ignition timing is controlled by the engine control unit for reducing the engine output of the vehicle engine so as to suppress the torque shock resulting from the speed change operation and the knocking in the vehicle engine in each of the above described embodiments, it is possible to control one or more controllable subjects other than the ignition timing for reducing the engine output of the vehicle engine so as to suppress the torque shock resulting from the speed change operation and the knocking in the vehicle engine.

What is claimed is:

1. A control system for a vehicle engine coupled with an automatic transmission, the control system comprising:
   controlling means operative to control a controllable subject in the vehicle engine, in accordance with a controlled variable determined for the controllable subject, for varying an engine output of the vehicle engine in response to an operating condition of the vehicle engine and further for reducing the engine output so as to suppress torque shock resulting from a speed change operation carried out in the automatic transmission,
   controlled variable setting means for determining said controlled variable in accordance with the operating condition of the vehicle engine and an operating condition of the automatic transmission, and
   controlled variable revising means for varying said controlled variable so as to restrict variation in said controllable subject when the speed change operation is carried out in the automatic transmission under a condition in which the controllable subject is controlled to reduce the engine output in response to the operating condition of the vehicle engine.

2. A control system according to claim 1, wherein said controlled variable setting means is operative to determine said controlled variable by means of combining a fundamental variable obtained based on the operating condition of the vehicle engine, a first supplemental variable obtained in response to a particular operating state of the vehicle engine and a second supplemental variable obtained in response to the speed change operation carried out in the automatic transmission.

3. A control system according to claim 2, wherein said controlled variable revising means is operative to restrain said second supplemental variable when said first supplemental variable has the effect of reducing the engine output.

4. A control system according to claim 3, wherein said controlled variable determining means is operative to obtain said first supplemental variable in response to knocking in the vehicle engine.

5. A control system according to claim 2, wherein said controlled variable revising means is operative to eliminate said second supplemental variable when said first supplemental variable has the effect of reducing the engine output.

6. A control system according to claim 1, wherein said controlling means is operative to control ignition timing in the vehicle engine as said controllable subject in accordance with said controlled variable in such a manner that the ignition timing is retarded to suppress the torque shock when the speed change operation is carried out in the automatic transmission.

7. A control system according to claim 6, wherein said controlling means is operative to retard the ignition timing for suppressing the torque shock when the speed change operation is carried out for shifting down in the automatic transmission.

8. A control system according to claim 1, wherein said controlled variable revising means is operative further to vary said controlled variable so as to restrict variation in said controllable subject in proportion to an octane value of fuel used in the vehicle engine on the occasion of the speed change operation carried out in the automatic transmission.

9. A control system for a vehicle engine coupled with an automatic transmission, the control system comprising:
- controlling means operative to control a controllable subject in the vehicle engine, in accordance with a controlled variable determined for the controllable subject, for varying an engine output of the vehicle engine in response to an operating condition of the vehicle engine and further for reducing the engine output so as to suppress torque shock resulting from a speed change operation carried out in the automatic transmission,
- controlled variable setting means for determining said controlled variable by means of combining a fundamental variable obtained based on the operating condition of the vehicle engine, a first supplemental variable obtained in response to a particular operating state of the vehicle engine and a second supplemental variable obtained in response to the speed change operation carried out in the automatic transmission, and
- controlled variable revising means operative to restrain said second supplemental variable for varying said controlled variable so as to restrict variation in said controllable subject when said first supplemental variable has the effect of reducing the engine output.

10. A control system according to claim 9, wherein said controlling means is operative to control ignition timing in the vehicle engine as said controllable subject in accordance with said controlled variable in such a manner that the ignition timing is retarded to suppress the torque shock when the speed change operation is carried out in the automatic transmission.

11. A control system according to claim 10, wherein said controlling means is operative to retard the ignition timing for suppressing the torque shock when the speed change operation is carried out for shifting down in the automatic transmission.

12. A control system for a vehicle engine coupled with an automatic transmission, the control system comprising:
- controlling means operative to control a controllable subject in the vehicle engine, in accordance with a controlled variable determined for the controllable subject, for varying an engine output of the vehicle engine in response to an operating condition of the vehicle engine and further for reducing the engine output so as to suppress torque shock resulting from a speed change operation carried out in the automatic transmission,
- controlled variable setting means for determine said controlled variable by means of combining a fundamental variable obtained based on the operating condition of the vehicle engine, a first supplemental variable obtained in response to a particular operating state of the vehicle engine and a second supplemental variable obtained in response to the speed change operation carried out in the automatic transmission, and
- controlled variable revising means operative to prevent one of said first and second supplemental variables smaller than the other from being combined for determining said controlled variable.

13. A control system according to claim 12, wherein said controlling means is operative to control ignition timing in the vehicle engine as said controllable subject in accordance with said controlled variable in such a manner that the ignition timing is retarded to suppress the torque shock when the speed change operation is carried out in the automatic transmission.

14. A control system according to claim 13, wherein said controlling means is operative to retard the ignition timing for suppressing the torque shock when the speed change operation is carried out for shifting down in the automatic transmission.

* * * * *